Nov. 9, 1943.   W. R. POSTLEWAITE   2,334,027
APPARATUS FOR FORMING SEAMLESS PIPES OR COATINGS
Filed Aug. 15, 1942
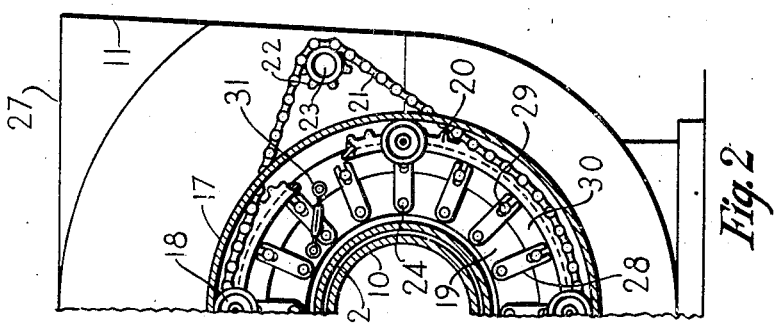
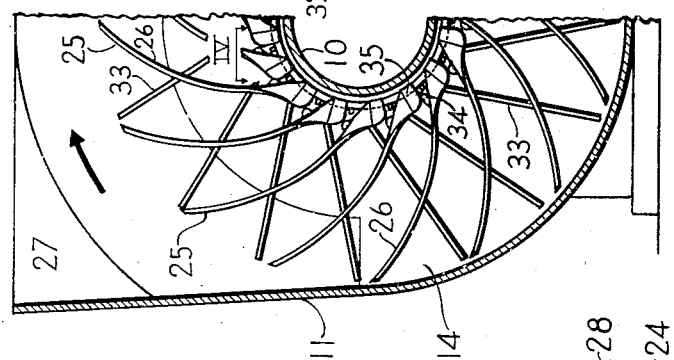
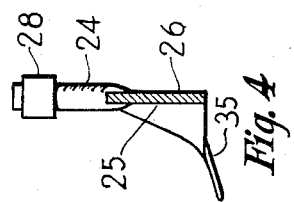
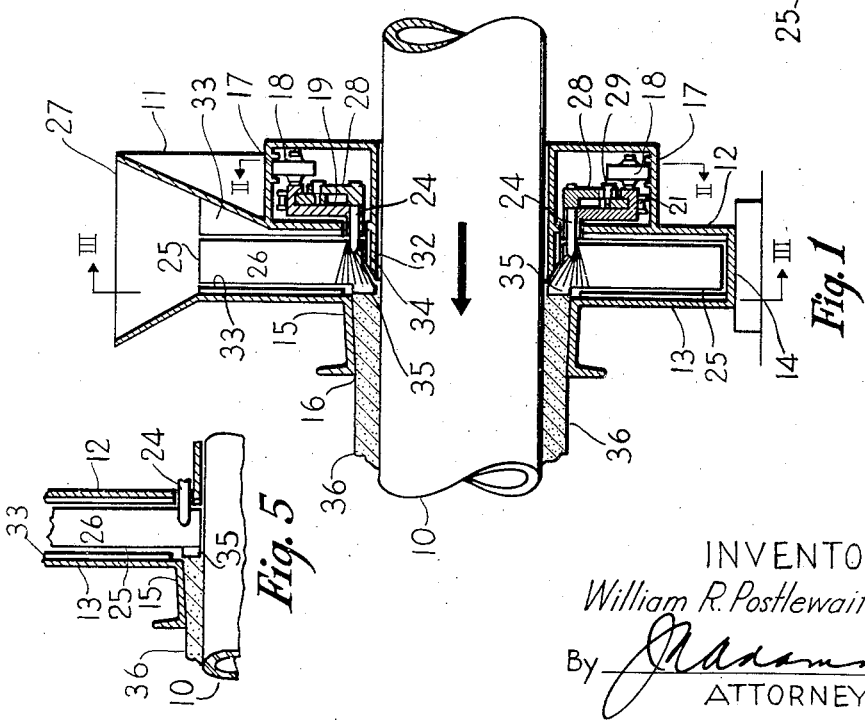
INVENTOR
William R. Postlewaite
By *[signature]*
ATTORNEY Patented Nov. 9, 1943

2,334,027

UNITED STATES PATENT OFFICE 2,334,027

APPARATUS FOR FORMING SEAMLESS PIPES OR COATINGS

William R. Postlewaite, Palo Alto, Calif., assignor to Standard Oil Company of California, San Francisco, Calif., a corporation of Delaware Application August 15, 1942, Serial No. 454,907

8 Claims. (Cl. 25—30)

This invention relates to the manufacture of seamless pipes and coating materials from initially plastic mixtures of fibrous materials and binders, and particularly refers to a method and apparatus for manufacturing a seamless pipe on a mandrel by applying a plurality of successive thin layers of said material to the end face of that part of the pipe or coating which has already been deposited on the mandrel or other cylindrical body.

In the manufacture of nonmetallic pipe and tubing, particularly those designed to withstand high internal pressures, plastic materials, such as are made from a mixture of a fibrous material, for example asbestos, and a binder, for example hydraulic cement, have been used and deposited in successive concentric thin layers on the outer surface of a cylindrical mandrel until the desired thickness was attained, after which the pipe section thus formed was removed from the mandrel, for example by collapsing it, and the pipe section cured in the usual manner. Such a method of operation generally resulted in the orienting of the fibrous material in random directions in substantially concentric layers at substantially equal distance from the center of the pipe. This fiber orientation resulted in a reinforcing of the normally low strength binder so that the pipe section thus formed was able to withstand hoop stresses as well as longitudinal forces due to internal pressures in the pipe.

This invention comprehends broadly the building up of a length of pipe on a mandrel by the simultaneous application of a plurality of thin layers circumferentially against the end face of the material already deposited. By suitable manipulation of the fibrous material and its binder, the fibers will be oriented to lie substantially circumferentially within the pipe wall thickness thus formed and will therefore be in a more advantageous position to reinforce the pipe against hoop stresses than the concentric layer deposited material. Such a mode of operation is also much more rapid and economical than those heretofore employed. The felting together of fibrous material in the successive thin helical layers thus deposited by this manipulation will be found to be adequate to give suitable longitudinal reinforcement so that the pipe will not tend to separate in helical planes or break due to longitudinal forces from internal pressure or other causes.

Under certain circumstances which will be recognized by those skilled in this art, this method and apparatus may also be utilized for the application of a corrosion-resistant coating to metallic pipes, for example those which are to be placed under water or in corrosive soil. Therefore, whenever the term mandrel is used it may be applied to a pipe on which the deposited material is permitted to remain as well as a temporary cylindrical support which merely defines the internal diameter and is subsequently removed.

It is an object of this invention to provide an improved method and apparatus for making seamless nonmetallic pipe by continually forming the same on a longitudinally advancing mandrel by simultaneously depositing thin layers of fiber-oriented plastic material against the end face of that portion of the pipe already deposited.

Another object is to provide a method and apparatus for applying a material of this nature to pipe or other cylindrical bodies on which the deposited coating is permitted to remain as a protection to said body.

Another object is to provide an improved arrangement of a plastic feeding and applying means for a pipe-forming or coating apparatus of this kind.

Another object is to provide a pipe-forming or coating means in which a much larger number of circumferentially spaced end applying blades or vanes are used than heretofore, for purposes which will be evident below.

These and other objects and advantages will be further apparent from the following description and from the accompanying drawing, which forms a part of this specification and illustrates a preferred embodiment together with alternative constructions which have been found to be desirable.

In the drawing,

Figure 1 is a longitudinal sectional view illustrating a preferred form of this invention as applied to a pipe-forming or coating operation.

Figure 2 is a vertical transverse sectional view on line II—II of Figure 1.

Fig. 3 is a vertical transverse sectional view on line III—III of Figure 1.

Figure 4 is a transverse sectional view of one form of vane taken on line IV—IV of Figure 3.

Figure 5 is a longitudinal vertical elevation of an alternative arrangement of vane to that shown in Figure 1.

In the drawing, reference numeral 10 designates a generally cylindrical mandrel or pipe which is adapted to be longitudinally advanced by any desired means. A stationary housing 11 is provided with a first wall 12 having an inlet opening through which mandrel 10 may extend. A second wall 13 is longitudinally spaced from the first wall along the axis of mandrel 10. These walls extend substantially transversely to the axis of the mandrel to form a radial chamber extending completely around the mandrel and generally designated 14. A sizing die 15 is positioned in wall 13 to be concentric with mandrel 10. In this example die 15 is illustrated as being slightly tapered inwardly as at 16 but under certain circumstances it may be either cylindrical throughout its length or consist of a simple narrow ring or opening in wall 13.

Housing 11 is provided at 17 with a circular track in which rollers 18 are adapted to revolve to carry a rotatable ring 19. On the outer surface of ring 19 is mounted a sprocket 20 around which chain 21 passes to a smaller sprocket 22 on shaft 23, the latter adapted to be rotated at a suitable speed by any desired power means (Figure 2). Ring 19 is adapted to support a plurality of stub shafts 24 which extend through a suitable circular opening in wall 12 to carry a plurality of vanes 25 so that the latter are rotatably mounted within chamber 14 formed between walls 12 and 13.

Vanes 25 consist generally of an outer portion or face 26 directed outwardly from shaft 24 toward the circumference of radial chamber 14. Outer face 26 is parallel to the axis of mandrel 10 and may be either bent or curved as shown in Figure 3, or straight and disposed in a plane substantially tangential to the periphery of mandrel 10, or may have other forms depending upon the consistency and nature of the plastic material which is to be handled. In any case, the outer portion 26 of vanes 25 is directed in such a manner that rotation of the vanes through radial chamber 14 will urge the plastic material introduced into said chamber through inlet 27 to move radially inwardly toward mandrel 10, as will be explained in further detail below.

Desirably, but not necessarily, stub shafts 24 may be pivoted in ring 19 and provided with means so that they may be simultaneously rotated through a small angle to vary the inclination of vanes 25 with respect to the mandrel surface. In this example the outer ends of stub shafts 24 are provided with slotted radial arms 28 which engage pins 29 on an adjusting ring 30 mounted on driving ring 19. By rotating ring 30 with respect to ring 19, stub shafts 24 will be simultaneously moved through a corresponding angle so that vanes 25 will be simultaneously positioned at the desired angle with respect to the mandrel axis. Turnbuckle 31 or other means connecting rings 19 and 30 will provide and maintain the desired adjustment.

The example shown in Figure 1 illustrates a stationary guide sleeve 32 carried by housing 11 and extending from the inlet of the housing along mandrel 10 between the outer surface of the mandrel and the inner ends of vanes 25. The alternative form shown in Figure 5 omits sleeve 32 and may be required with certain types and consistencies of plastic material.

Figure 3 illustrates a plurality of angularly directed lands 33 secured to the inner faces of walls 12 and 13 to promote the movement of the plastic material inwardly toward mandrel 10. If the embodiment of Figure 1 is used, where guide sleeve 32 surrounds mandrel 10, similar lands 34 may be placed on the outer surface of said sleeve to facilitate the movement of the plastic toward the annular opening formed between mandrel 10 and sizing die 15.

As stated above, vanes 25 consist generally of an outer portion 26, the face of which is preferably parallel to the axis of mandrel 10. The inner portion of vanes 25 is desirably warped or curved as indicated at 35 so that it has a trailing face which is substantially at right angles to the axis of mandrel 10 or is only a few degrees, for example 5 to 20 degrees, from such a right angle. Desirably the inner face 35 may extend circumferentially a short distance around the annular outlet opening as shown in Figure 3 and may terminate in a relatively sharp edge which acts to deposit a thin layer of material on that portion of plastic material 36 already deposited by the preceding vanes. The provision of a large number of such vanes, each acting to deposit only a thin layer, circumferentially positions or orients the fibers in the plastic material 36 so that they may properly be designated as "fiber-oriented." As pointed out above, fibers oriented in this manner act to reinforce the finished pipe or coating against hoop stresses such as may be caused by internal pressure or expansion and make a very dense, homogeneous, and strong product. Desirably about one vane for each inch of diameter of the finished coating should be provided although a greater or lesser number may be required under certain circumstances of diameter and thickness of wall which will be apparent to one skilled in this art.

In conclusion, it will be apparent that the method described above comprehends broadly the steps of moving a body of plastic material radially inwardly around the entire periphery of a mandrel or pipe and then depositing successive thin layers of fiber-oriented material on the end face of that material which has already been deposited within a circumferential sizing means.

Although a single form of apparatus for practicing this method has been illustrated and described, it is obvious that other suitable forms will be apparent to one skilled in this art and all such modifications and changes that fall within the scope of the appended claims are embraced thereby.

I claim:

1. Apparatus for forming a seamless pipe or coating from an initially plastic mixture of fibrous material and a binder, comprising a longitudinally movable cylindrical mandrel to define the inside diameter of the pipe or coating, a stationary housing having a wall with an inlet opening through which said mandrel extends, a second housing wall longitudinally spaced from said first wall, both of said walls extending substantially transversely to the axis of said mandrel to form a radial chamber surrounding said mandrel, a stationary sizing die carried by said second-named wall and concentric with said mandrel, said die and said mandrel cooperating to form an annular outlet passage, an inlet for plastic material for said chamber, and a plurality of closely circumferentially spaced inclined outwardly extending vanes rotatably mounted in said chamber, each of said vanes having an outer face substantially parallel to the mandrel axis to cooperate with a wall of said radial chamber to urge plastic inwardly toward said mandrel and a trailing face substantially at right angles to said mandrel axis, said trailing face being positioned opposite said annular passage to traverse the same and to deposit a thin layer of circumferentially fiber-oriented plastic material on the end face of the pipe or coating already formed on said mandrel within said sizing die.

2. Apparatus according to claim 1 in which said trailing face of said vane extends circumferentially for a part of the distance between adjacent vanes.

3. Apparatus according to claim 1 with the addition of pivoted means supporting said rotatable vanes and interconnecting means for said pivoted means so constructed and arranged that the angularity of the outer face of said vanes may be simultaneously varied with regard to a truly radial position.

4. Apparatus according to claim 1 with the addition of a stationary guide sleeve secured to the first-named housing wall, said sleeve extending substantially throughout the length of said radial chamber and coaxial with said mandrel.

5. Apparatus for forming a seamless pipe or coating from an initially plastic mixture of fibrous material and a binder, in which a pipe or mandrel is advanced longitudinally with respect to aligned openings in a housing having opposed walls forming a radial chamber disposed in a plane substantially transverse to the mandrel axis, characterized by the provision of a plurality of circumferentially spaced outwardly extending vanes rotatably mounted in said chamber, each vane having an outer portion substantially parallel to the mandrel axis and inclined to the surface of the mandrel in its direction of rotation to feed said plastic material radially inwardly throughout said chamber, each vane having a trailing face adjacent said mandrel and substantially at right angles to its axis, said trailing face adapted to deposit a thin layer of fiber-oriented plastic material on the end face of the pipe or coating already formed on that part of the mandrel leaving said housing.

6. Apparatus according to claim 5 with the addition of means interconnecting said vanes for simultaneously varying the angle they are inclined with respect to the mandrel surface.

7. Apparatus according to claim 5 with the addition of a stationary guide sleeve for said mandrel, said sleeve extending substantially throughout said housing to prevent deposition of plastic material on the surface of said mandrel ahead of that deposited in thin successive layers on the end face of the newly formed pipe or coating by the trailing faces of said vanes.

8. Apparatus for forming a seamless pipe or coating from an initially plastic mixture, in which a mandrel or pipe is advanced longitudinally with respect to aligned openings in a housing having opposed walls forming a radial chamber disposed in a plane substantially transverse to the mandrel axis, characterized by the provision of a plurality of circumferentially spaced outwardly extending vanes rotatably mounted in said chamber, each vane having an outer portion substantially parallel to the mandrel axis and inclined to the surface of the mandrel in its direction of rotation to feed said plastic mixture inwardly throughout said chamber, each vane having a trailing face adjacent said mandrel and substantially at right angles to the axis thereof, said trailing face adapted to deposit a thin layer of plastic material on the end face of the pipe or coating already formed on that part of the mandrel leaving said housing.

WILLIAM R. POSTLEWAITE.